US011215552B2

(12) United States Patent
Stewart et al.

(10) Patent No.: US 11,215,552 B2
(45) Date of Patent: Jan. 4, 2022

(54) APPARATUS AND METHOD FOR BOND INSPECTION WITH LIMITED ACCESS

(71) Applicant: The Boeing Company, Chicago, IL (US)

(72) Inventors: Alan F. Stewart, Des Moines, WA (US); Marc J. Piehl, Renton, WA (US)

(73) Assignee: The Boeing Company, Chicago, IL (US)

( * ) Notice: Subject to any disclaimer, the term of this patent is extended or adjusted under 35 U.S.C. 154(b) by 717 days.

(21) Appl. No.: 16/008,189

(22) Filed: Jun. 14, 2018

(65) Prior Publication Data
US 2019/0383727 A1    Dec. 19, 2019

(51) Int. Cl.
*G01N 19/04*    (2006.01)
*B23K 26/14*    (2014.01)
(Continued)

(52) U.S. Cl.
CPC ........... *G01N 19/04* (2013.01); *B23K 26/064* (2015.10); *B23K 26/0643* (2013.01);
(Continued)

(58) Field of Classification Search
CPC .............. B23K 26/052; B23K 26/064; B23K 26/0643; B23K 26/0652; B23K 26/0648;
(Continued)

(56) References Cited

U.S. PATENT DOCUMENTS 5,221,823 A * 6/1993 Usui .................. B23K 26/0884
219/121.63
6,288,358 B1 * 9/2001 Dulaney .............. B23K 26/032
219/121.6
(Continued)

FOREIGN PATENT DOCUMENTS

GB          2033649 A  *  5/1980 ......... B23K 26/0643
WO   WO-2012071050 A1  *  5/2012 ........... B23K 26/073

OTHER PUBLICATIONS

Ehrhart et al., "Development of a laser shock adhesion test for the assessment of weak adhesive bonded CFRP structures," Int'l J. of Adhesion and Adhesives, vol. 52 (2014), pp. 57-65. The year of publication of the Ehrhart NPL (2014) is sufficiently earlier than the effective U.S. filing date of the instant application and any foreign priority date so that the particular month of publication is not in issue.
(Continued)

*Primary Examiner* — Geoffrey S Evans
(74) *Attorney, Agent, or Firm* — Ostrager Chong Flaherty & Broitman P.C.

(57) ABSTRACT

Apparatus and methods for laser bond inspection (LBI) of internal bonds in a composite structure with limited access. The technology solves the problem of access for an LBI process head through selection of optics, an articulated optical path and simplification of the method of collecting debris. A small-format process head is specifically designed for laser bond inspection in limited-access spaces. This process head allows access to locations within ½ inch of a nearby wall or structure and utilizes a laser beam that is much smaller (~2-3 mm) in diameter. The apparatus incorporates articulated joints to improve access to locations in the structure being inspected. The process head may also be configured to protect the optical elements (e.g., the focusing lens) from blow-back of debris from the LBI inspection process.

20 Claims, 8 Drawing Sheets

(51) Int. Cl.
  *B23K 26/064* (2014.01)
  *G01N 29/24* (2006.01)
  *G02B 5/136* (2006.01)
  *G01N 29/04* (2006.01)
  *B23K 26/06* (2014.01)

(52) U.S. Cl.
  CPC .......... *B23K 26/0652* (2013.01); *B23K 26/14* (2013.01); *G01N 29/043* (2013.01); *G01N 29/2418* (2013.01); *G02B 5/136* (2013.01); *G01N 2291/0231* (2013.01); *G01N 2291/2694* (2013.01)

(58) Field of Classification Search
  CPC ... G01N 19/04; G01N 29/2418; G01N 29/043
  See application file for complete search history.

(56) References Cited

U.S. PATENT DOCUMENTS

| | | | |
|---|---|---|---|
| 6,622,568 B2 | 9/2003 | Nelson et al. | |
| 6,848,321 B2 | 2/2005 | Bossi et al. | |
| 7,341,758 B2 | 3/2008 | Stewart et al. | |
| 7,507,312 B2 | 3/2009 | Bossi et al. | |
| 7,509,876 B1 | 3/2009 | Sokol et al. | |
| 7,770,454 B2 * | 8/2010 | Sokol | G01N 29/2412 73/588 |
| 7,775,122 B1 | 8/2010 | Toller et al. | |
| 8,132,460 B1 | 3/2012 | Toller et al. | |
| 8,714,016 B2 | 5/2014 | Stewart et al. | |
| 9,201,017 B2 | 12/2015 | Lahrman et al. | |
| 9,371,957 B2 * | 6/2016 | Dallarosa | A61B 90/50 |
| 9,464,965 B2 | 10/2016 | Bossi et al. | |
| 9,625,425 B2 | 4/2017 | Stewart et al. | |
| 9,804,127 B2 | 10/2017 | Bossi et al. | |
| 9,939,411 B2 | 4/2018 | Smith et al. | |
| 2007/0075058 A1 * | 4/2007 | Ehrmann | B23K 26/043 219/121.69 |
| 2007/0235418 A1 * | 10/2007 | Park | B23K 26/0613 219/121.6 |
| 2008/0191150 A1 * | 8/2008 | Yamauchi | B23K 26/037 250/492.1 |
| 2013/0228557 A1 * | 9/2013 | Zediker | B23K 26/1462 219/121.61 |
| 2014/0069898 A1 * | 3/2014 | Debecker | B23K 26/1462 219/121.72 |

OTHER PUBLICATIONS

Perton et al., "Adhesive bond testing of carbon-epoxy composites by laser shockwave," J. of Physics D: Applied Physics, vol. 44, No. 3 (2011), pp. 1-12. The year of publication of the Perton NPL (2011) is sufficiently earlier than the effective U.S. filing date of the instant application and any foreign priority date so that the particular month of publication is not in issue.

* cited by examiner

APPARATUS AND METHOD FOR BOND INSPECTION WITH LIMITED ACCESS

BACKGROUND

The present disclosure generally relates to testing of bonded structural joints and more particularly to non-destructive testing of bonded joints between composite structures.

Bonded joints are widely used in a variety of structural applications, and more specifically, primary composite structures are often bonded together in aerospace applications. Generally, the strength of the bonded joint between composite structures must be known and certifiable if the bonded joint is used in a primary structure application. Conventional measurement of bond strength generally involves static and dynamic proof testing of entire structural assemblies, wherein several joints and structures are subjected to loads and then monitored for strain levels, which strain levels are then correlated to bond strength values.

The strength of bonds can be tested using calibrated shock waves (stress waves) generated at the surface of composite (and other) joints. Previously full-scale proof testing of bonded structure has been the only sure method of detecting "kissing" or weak bonds. Laser bond inspection (LBI), using high-intensity stress waves, has been shown to provide a method for localized testing of bond strength.

Controlled stress waves of sufficient intensity have been shown to be useful for evaluation of adhesion. High-peak-power, short pulse laser systems have been shown to reliably and repeatedly test the strength of internal bond lines in composite joints. Modeling of the method has shown that the interaction of the laser with the surface results in controlled, very localized testing of bond strength. A high-peak-power laser system and beam delivery method has been designed for factory implementation. To date, numerous tests on composite-to-composite bonds have shown the method to be sensitive to weak bonds created by poor adhesive mixing, improper surface preparation and/or contamination.

The LBI method offers the ability to verify bond strength without damaging the structure under test. But the structure to be inspected may be in a location where an LBI system having a large process head (e.g., about 16" tall×5" wide and 5" across with water lines and vacuum lines) cannot get to—for example, access is difficult inside a wing box. Making laser bond inspection more versatile by expanding the operational envelope will enhance its utilization both in supporting fabrication of bonded structure and in repair functions.

SUMMARY

The subject matter disclosed in some detail below is directed to an apparatus and methods for laser bond inspection of internal bonds in a composite structure configured with areas allowing limited access by a process head. As used herein, the term "composite structure" refers to a laminate consisting of multiple plies of fiber-reinforced plastic material adhesively bonded together. As used herein, the term "process head" means an optical subassembly that serves as an interface between a laser beam delivery system and an article or workpiece undergoing LBI. The LBI process head design disclosed herein provides the ability to perform an LBI test in a very small area (e.g., the laser spot produced at the point of impingement may have a diameter in a range of approximately 2-3 mm).

The technology disclosed in some detail below solves the problem of access for an LBI process head through selection of optics, an articulated optical path and simplification of the method of collecting debris. A small-format process head is specifically designed for laser bond inspection in limited-access spaces. This process head allows access to locations within ½ inch of a nearby wall or structure and utilizes a laser beam that is much smaller (~2-3 mm) in diameter. The process head incorporates articulated joints to improve access to locations in the structure being inspected. The process head may also be configured to protect the optical elements (e.g., the focusing lens) from blow-back of debris from the LBI inspection process.

Although various embodiments of apparatus and methods for laser bond inspection of internal bonds in a composite structure with limited access will be described in some detail below, one or more of those embodiments may be characterized by one or more of the following aspects.

One aspect of the subject matter disclosed in detail below is a process head comprising: a lens tube having a centerline and optically coupled to admit a laser beam from a beam delivery system; a focusing lens disposed inside the lens tube; a first housing which is rotatable relative to the lens tube about the centerline and having a first opening facing the focusing lens and a second opening not facing the focusing lens; a first reflector disposed inside the first housing and configured and oriented to turn a laser beam entering the first housing via the first opening by a first turning angle so that the laser beam exits the first housing via the second opening; a second housing which is rotatable relative to the first housing and having a third opening facing the second opening in the first housing and a fourth opening not facing the second opening in the first housing; a second reflector disposed inside the second housing and configured and oriented to turn a laser beam entering the second housing via the third opening by a second turning angle so that the laser beam exits the second housing via the fourth opening; and a coupler mechanically coupled to the second housing and having an opening at a distal end through which a laser beam received from the second reflector will exit the coupler. The system is configured so that a laser beam impinging on a surface being inspected will form a spot having a diameter in a range of approximately 2 to 3 mm.

Another aspect of the subject matter disclosed in detail below is a system for delivering a laser beam to a surface of a part with limited access, comprising: a laser device configured to emit a laser beam; a beam delivery system optically coupled to receive any laser beam from the laser device and comprising an articulated arm; and a process head optically coupled to receive and configured to focus any laser beam from the laser device, wherein the process head has the structure described in the preceding paragraph.

In accordance with some embodiments, the process head further comprises: a second coupler that mechanically couples the first coupler to the second housing; a protective window disposed inside the second coupler in an optical path of any laser beam exiting the second housing via the fourth opening; a gas inlet intersecting and connected to a wall of the first coupler at an oblique angle and in fluid communication with an interior volume of the first coupler; a third coupler that is joined to the first coupler near one end of the first coupler so that the first and third coupler intersect at an oblique angle; and a particle trap coupled to another end of the third coupler and in fluid communication with an interior volume of the third coupler.

A further aspect of the subject matter disclosed in detail below is a method for laser bond inspection of internal bonds in a composite structure configured with areas allowing limited access, comprising the following steps: (a) inserting an ultrasonic probe into a space having limited access; (b) using the ultrasonic probe to acquire first ultrasonic inspection data from a portion of a composite structure that partly bounds the space; (c) removing the ultrasonic probe from the space; (d) inserting a laser bond inspection process head into the space vacated by the ultrasonic probe; (e) applying a shock wave produced by the laser to the portion of the composite structure from which the first ultrasonic inspection data was acquired using the laser bond inspection process head; (f) removing the laser bond inspection process head from the space; (g) inserting the ultrasonic probe into the space vacated by the laser bond inspection process head; (h) using the ultrasonic probe to acquire second ultrasonic inspection data from the portion of the composite structure; (i) comparing the second ultrasonic inspection data to the first ultrasonic inspection data; and (j) evaluating any differences between the first and second ultrasonic inspection data to determine whether the differences indicate a bond failure. Preferably, step (e) comprises directing a laser beam onto a surface of the portion of the composite structure to form a laser spot having a diameter in a range of approximately 2 to 3 millimeters.

Other aspects of apparatus and methods for laser bond inspection of internal bonds in a composite structure with limited access are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Illustrative embodiments of apparatus and methods for laser bond inspection of internal bonds in a composite structure with limited access are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The apparatus and method disclosed in some detail below provides a technical solution to the technical problem of performing laser bond inspection in limited-access spaces. The method involves first performing an ultrasonic inspection of a portion of a composite structure bounding a small space using an ultrasonic probe configured to enter the small space. The ultrasonic probe may be mounted to an extended-reach inspection apparatus of the type disclosed in U.S. Pat. No. 9,939,411, the disclosure of which is incorporated by reference herein in its entirety. Upon completion of the ultrasonic inspection, the ultrasonic probe is removed and an LBI process head (mounted to a separate and distinct articulated arm to which the ultrasonic probe was mounted) is inserted into the same small space. The LBI system is then operated to produce a shock wave inside the previously ultrasonically inspected portion of the composite structure. Then the LBI process head is removed, the ultrasonic probe is re-positioned in the same small space vacated by the LBI process head, and a post LBI shock wave ultrasonic inspection of the same portion of the composite structure is performed. Upon completion of the post-shock ultrasonic inspection, pre-shock and post-shock ultrasonic inspection data are compared and any differences are evaluated to determine whether a shock-induced bond failure occurred in the composite structure.

Figure 1:
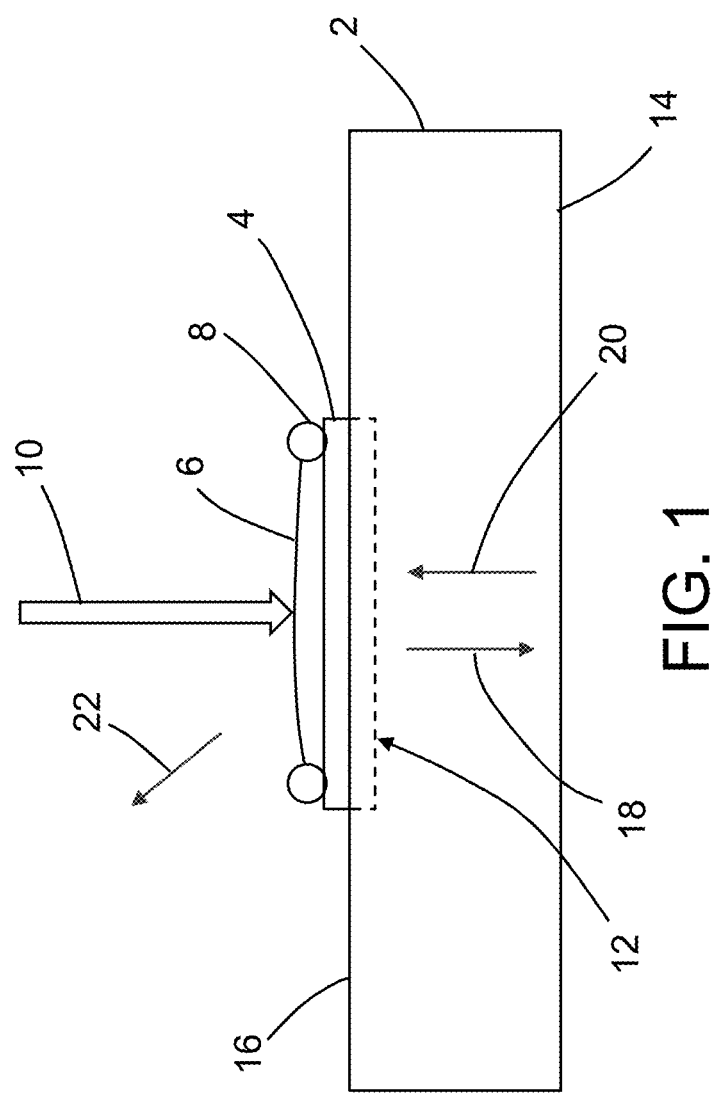
FIG. 1 is a diagram representing a side view of a typical setup for laser shock generation using water as the tamping layer overlying the ablative layer.

FIG. 1 illustrates the fundamental process of laser-generated shock wave creation in a composite laminate 2 having a back surface 14 and a front surface 16. Prior to generation of a laser pulse 10 by a controllable laser source (not shown in FIG. 1), an ablative layer 4 (a.k.a. "sacrificial overlay") is provided on the front surface 16 of the composite laminate 2. The ablative layer 4 may be a light-absorbing paint, a polyvinyl chloride tape or a light-absorbing fluid. A tamping layer 6 (usually water) is placed on top of the ablative layer 4 and held in place by an O-ring 8. Alternatively, a washer may be used.

The energy delivered by the laser pulse 10 is absorbed in the ablative layer 4 and the ejection of material from the ablative layer compresses the surface of the structure 12 (indicated by dashed lines in FIG. 1) near the front surface 16 of the composite laminate 2. No sample heating takes place, and there is no surface damage. Some of the material of the ablative layer 4 will be converted into a plasma by the impinging laser pulse 10. Additional material may be ejected from the ablative layer 4 to produce flying debris 22.

The laser pulse impingement and the resulting ablation create an impulse which travels through the composite laminate as a compressive stress wave 18. The tamping layer 6 acts to reflect the energy of the expanding plasma back into the composite laminate 2 to enhance the amplitude of the compressive stress wave 18. The compressive stress wave 18 propagates to the back (free) surface 14 of the composite laminate 2, where it reflects back in tension as a tensile stress wave 20. In the one-dimensional approximation, it is this tensile stress wave 20 propagating through the composite laminate 2 that provides the proof-test loading. When the tensile stress wave 20 arrives back at the front surface 16, it reflects into compression again, and the cycle repeats. The ablative layer 4 absorbs the laser energy and generates the stress wave, as well as protects the front surface 16 of the composite laminate 2 from being adversely impacted by the laser pulse 10.

Although FIG. 1 depicts only a single composite laminate and may be used to determine if the laminate material itself exhibits strength adequate to meet or exceed the design requirements. The same principles may be used to inspect an adhesive bond between two composite laminates. To perform such a laser bond inspection, a laser pulse 10 at the test fluence is applied to stress the bond such that a bond having a bond strength greater than a minimum allowable bond strength will not be adversely affected by the laser-induced shock load, but a bond having a bond strength less than the minimum allowable bond strength will fail.

Figure 2:
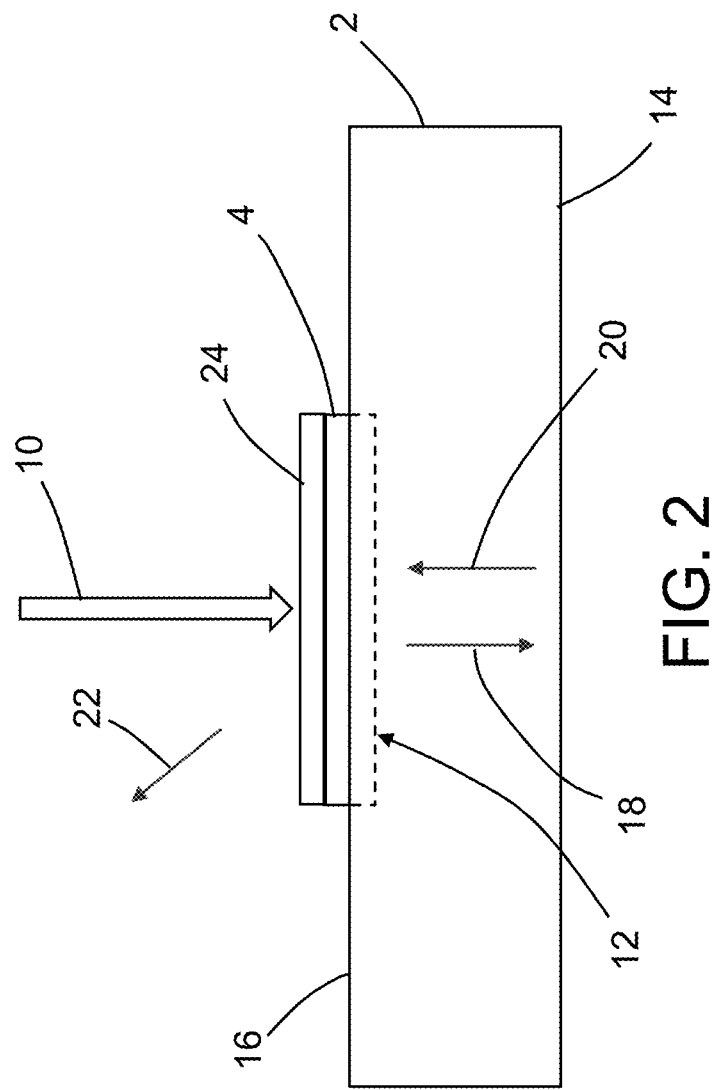
FIG. 2 is a diagram representing a side view of a typical setup for laser shock generation using a transparent tape as a tamping layer overlying the ablative layer.

The use of water as a tamping layer may be disadvantageous in some situations wherein the surface of the portion of the composite structure being subjected to the laser shock load is not horizontal and facing upward, in which case the water depicted in FIG. 1 may not stay in place. FIG. 2 is a diagram representing a side view of another typical setup for laser shock generation, except in this example, a substantially optically transparent adhesive tape 24 is used as the tamping layer overlying the ablative layer 4. In the LBI technique disclosed herein, substantially optically transparent adhesive tape 24 will be used as the tamping layer. A thin layer of water may also be encapsulated under the transparent tape.

Figure 3:
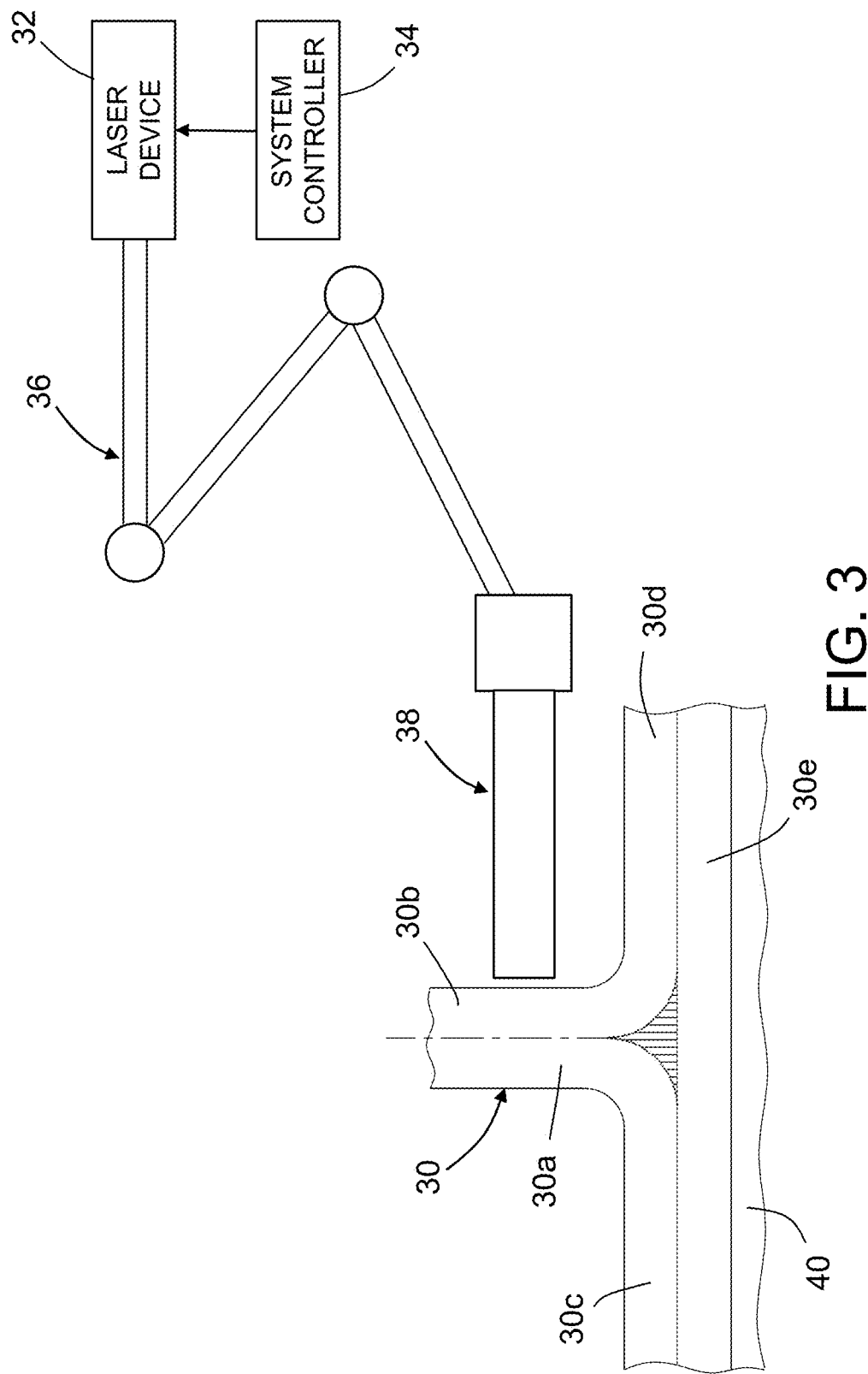
FIG. 3 is a diagram representing a view of a laser bond inspection system having an LBI process head mounted to an articulated arm for applying a laser shock load to a web of a stiffener made of composite material.

FIG. 3 is a diagram representing a view of a laser bond inspection system having an LBI process head 38 mounted to beam delivery system 36 for applying a laser shock load to composite laminate. In this example, FIG. 3 shows an end view of a typical interface between a blade stringer 30 and a skin panel 40, each made of composite material. A blade stringer is shown for the purpose of illustration only. The laser bond inspection technique disclosed herein can be applied with equal efficacy to other types of composite structures.

Still referring to FIG. 3, the blade stringer 30 comprises a formed sheet of generally elongated, adjacent, parallel blades 30*a* and 30*b*. Each blade 30*a* and 30*b* may comprise a respective multiplicity of composite plies between respective layers of resin-infused fabric. The blade stringer 30 further comprises a pair of flanges 30*c* and 30*d* which respectively extend outwardly from the blades 30*a* and 30*b* at respective blade/flange junctions. The plane of each flange 30*c* and 30*d* may be disposed in generally perpendicular relationship with respect to the plane of the corresponding blades 30*a* and 30*b*. The blade stringer 30 further comprises a base charge 30*e*. The flanges 30*c* and 30*d* are bonded to the base charge 30*e*, which is in turn bonded to the skin panel 40. A channel bounded by the blade/flange junctions and the base charge 30*e* is filled with a noodle (indicated by hatching) made of composite material.

FIG. 3 shows a laser bond inspection system for evaluating the integrity of a bonded joint in the blade stringer 30. The system includes a laser device 32 for emitting radiant energy, a system controller 34 configured to control operation of the laser device 32, a beam delivery system 36 (generally depicted in the exemplary form of an articulated arm assembly) that receives the laser beam from the laser device 32, and a process head 38 that receives the laser beam from the beam delivery system 36.

More specifically, the laser device 32 is configured to emit a laser beam 10 under the control of the system controller 34. The beam delivery system 36 is optically coupled to receive any laser beam from the laser device 32. The beam delivery system 36 comprises mechanical links and revolute joints configured to form an articulated arm, as well as optical components (supported by the mechanical components) configured to define an optical path for the laser beam as it propagates from the laser device 32 to the process head 38. The process head 38 is optically coupled to receive the laser beam from the beam delivery system 36. In addition, the process head 38 is configured to focus the laser beam and reduce it in size.

The laser device 32 preferably emits a laser beam in the form of pulses. In general, the pulse width should have a width shorter than the width of the stress wave pulse desired for interrogating the structure of interest. The pulse width should be shorter than the transit time of a stress wave through the material thickness being inspected. The wavelength of the laser may be any suitable wavelength that permits generation of a stress wave in the material under study. Particularly useful are solid-state lasers because they are reliable and compact. The pulse energy of the laser should be sufficient to provide a specified fluence over an area with characteristic dimensions comparable to the thickness of the material being tested. The specified fluence should be of sufficient magnitude to produce the desired interrogating tensile stress in the material.

By control of the laser device 32 to provide a laser pulse to create a desired energy and pulse width in the blade stringer 30 with a desired beam circumference, the reflecting tension wave that impinges at a weak point in an adhesive bond layer may break or debond the adhesive layer in the impingement area corresponding to the beam circumference or smaller, thereby creating a disbond. In exemplary embodiments, the wavelength of the laser source may be 694.3 nm, 1054 nm, 1064 nm, 1315 nm or any equivalent pulsed laser with sufficient pulse energy. A pulse shape having a 100-300 nsec half-width, a spot size ranging from 2 to 10 mm in diameter, and a peak fluence (energy/unit area) ranging from approximately 4 to 100 $J/cm^2$ may be sufficient to produce a disbond in a weakened adhesive layer.

Figure 4:
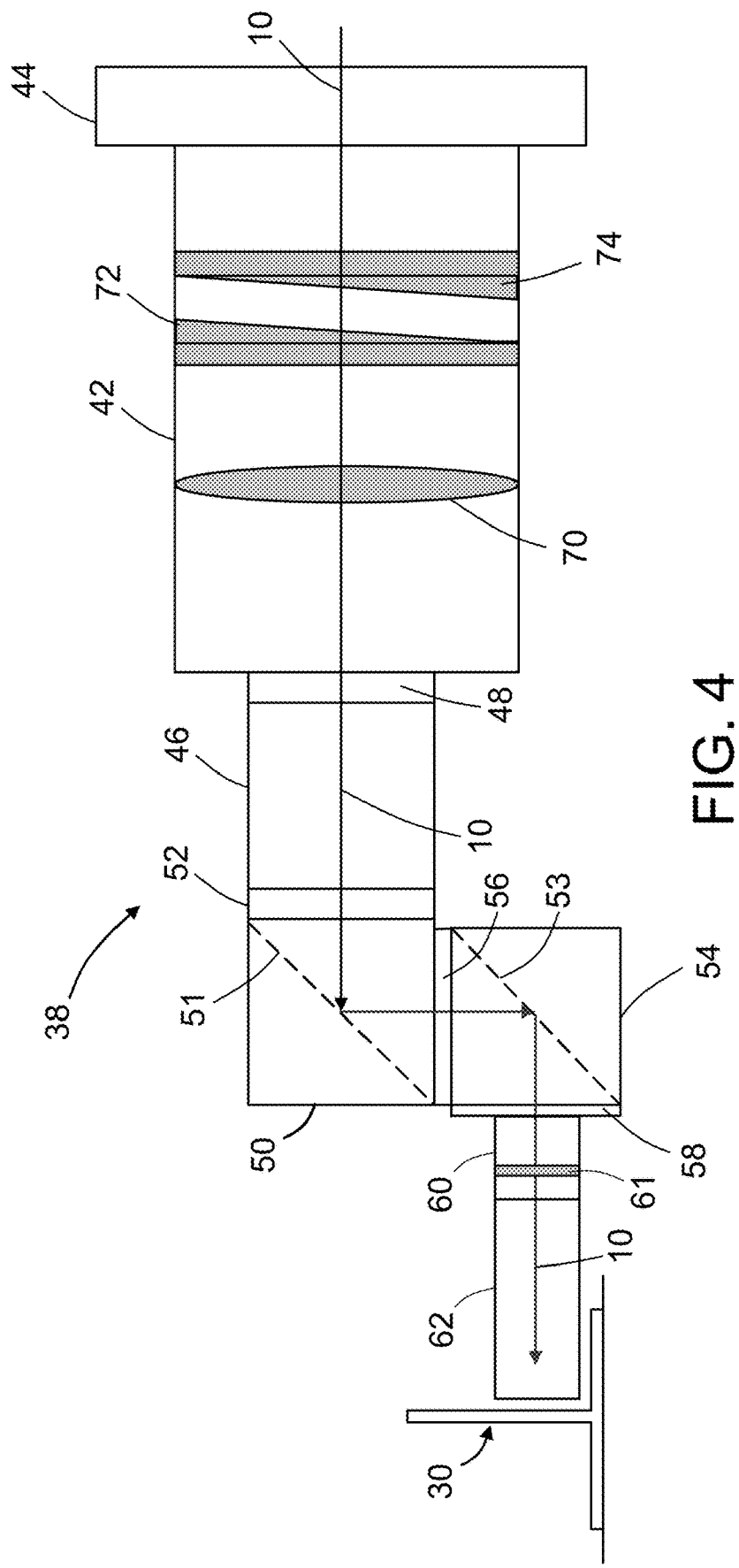
FIG. 4 is a diagram representing a side view of an LBI process head in accordance with one embodiment.

The small-format process head disclosed herein is designed to access small spaces. FIG. 4 is a diagram representing a side view of an LBI process head 38 in accordance with one embodiment. The process head 38 may be attached to a distal end of an articulated arm of a beam delivery system by means of an interface flange 44. In one proposed implementation, the interface flange 44 is a right-angle bracket with a clear aperture.

In accordance with one embodiment, the process head 38 includes a lens tube system consisting of the following components: a lens tube 42 having a centerline and one end coupled to the interface flange 44, a lens tube spacer 46 having one end coupled to the other end of the lens tube 42 by means of an adapter 48, a first housing 50 rotatably coupled to the other end of the lens tube spacer 46 by means of a hermetically sealed revolute joint 52, a second housing 54 rotatably coupled to the first housing 50 by means of a hermetically sealed revolute joint 56, a coupler 60 having one end coupled to the second housing 54 by means of an adapter 58, and a coupler 62 having one end coupled to the other end of coupler 60. In accordance with one proposed implementation, the hermetically sealed revolute joints 52 and 56 have lubrication (preferably a solid lubricant such as polytetrafluoroethylene). The housings 50 and 54 may be manually rotated into respective angular positions by a technician during setup of the laser bond inspection system.

The components of the lens tube system may be made of anodized aluminum. In accordance with one proposed implementation, the following optical components are housed inside various components of the lens tube system. A pair of prisms 72 and 74 that form an anamorphic prism pair are disposed inside the lens tube 42. A focusing lens 70 is also disposed inside the lens tube 42 in a position following the anamorphic prism pair. In addition, a first reflector 51 is disposed inside the first housing 50 and a second reflector 53 is disposed inside the second housing 54. Also a protective window 61 is disposed inside the coupler 60. The anamorphic prism pair is configured to change the shape of the laser beam to produce an elliptical profile such that a circular profile is projected onto the surface of the part when the beam is projected off-normal.

The optical functionality of the process head 38 depicted in FIG. 4 will now be described in some detail. The focusing lens 70 is disposed inside the lens tube 42 and has a center intersected by the centerline of the lens tube 42. The first housing 50 is mechanically and optically coupled to an exit end of the lens tube 42 and has a first opening facing the focusing lens 70 and a second opening not facing the focusing lens 70. The first reflector 51 (a reflective surface of which is indicated by a dashed line in FIG. 4) disposed inside the first housing 50 lies in the optical path of any laser beam focused by the focusing lens 70. The first reflector 51 is configured and oriented to turn any laser beam entering the first housing 50 via the first opening of the first housing 50 by a first turning angle so that the laser beam exits the first housing 50 via the second opening of the first housing 50. The second housing 54 is mechanically and optically coupled to the first housing 50. The second housing 54 has a third opening facing the second opening in the first housing 50 and a fourth opening not facing the second opening in the first housing 50. The second reflector 53 (a reflective surface of which is indicated by a dashed line in FIG. 4) disposed inside the second housing 54 lies in the optical path of any laser beam reflected by the first reflector 51. The second reflector 53 is configured and oriented to turn any laser beam entering the second housing 54 via the third opening by a second turning angle so that the laser beam exits the second housing 54 via the fourth opening. The protective window 61 is disposed inside the second coupler 60, and the second coupler 60 mechanically couples the first coupler 62 to the second housing. In addition, the protective window 61 is mechanically and optically coupled to the second housing 54 and disposed in an optical path of any laser beam exiting the second housing 54 via the fourth opening. The protective window 61 protects the first reflector 51, second reflector 53 and focusing lens 70 from being damaged by debris blown back from the ablation layer during application of the laser shock load on the blade stringer 30 (or other composite structure). The coupler 62 is mechanically and optically coupled to the coupler 60 and has an opening at a distal end thereof through which any laser beam received from the second reflector 53 will exit the coupler 62 and impinge upon the blade stringer 30 (or other composite structure).

Figure 5:
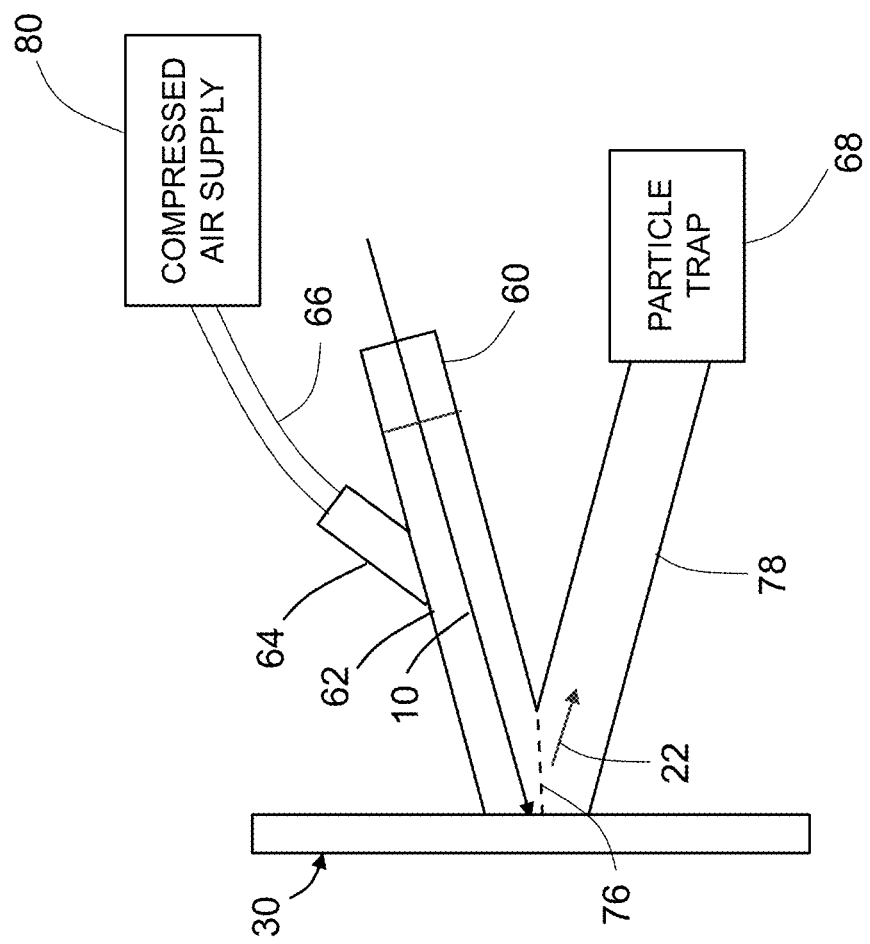
FIG. 5 is a diagram representing a top view of a portion of an LBI process head in accordance with another embodiment.

FIG. 5 is a diagram representing a top view of a portion of an LBI process head in accordance with another embodiment. Although not shown in FIG. 5, this alternative embodiment includes all of the components depicted in FIG. 4, except that the coupler 62 is modified in several respects during fabrication of the process head 38.

A hole is formed in a wall of the coupler 62 and a gas inlet 64 is joined to the portion of the wall surrounding the hole. Then one end of a hose 66 is connected to the end of the gas inlet 64. The other end of the hose 66 is connected to a compressed air supply 80. In this manner, when the compressed air supply 80 is turned on, pressurized air is forced into the interior volume of the coupler 62 via the gas inlet 64. The gas inlet 64 extends away from the coupler 62 at a first oblique angle (relative to the centerline of the coupler 62) such that pressurized air inside the coupler 62 flows toward the blade stringer 30, impinging on the confronting surface of the blade stringer 30. Optionally, multiple hoses may be connected to multiple gas inlets distributed at equi-angular intervals around the circumference of the coupler 62.

The coupler 62 is also modified by cutting off a portion of the wall of coupler 62 and then joining the cut edge to a similarly cut portion of another coupler 78 (see FIG. 5) so that the first and third coupler intersect at an oblique angle. The result is a V-shaped coupler consisting of first and second tubes, the first tube being coupler 62 and the second tube being coupler 78. The process head 38 further includes a particle trap 68 coupled to the other end of the coupler 78 and in fluid communication with an interior volume of the coupler 78. In accordance with one proposed implementation, the particle trap 68 is an air filter.

As seen in FIG. 5, the joined couplers 62 and 78 are configured so that air flowing through coupler 62 will be diverted into the third coupler 78 when the opening of the joined first and third couplers is blocked by the surface of the structure being inspected. For example, the centerline of the coupler 62 is oriented at an oblique angle relative to the confronting surface of the blade stringer 30 (or other composite structure being inspected), which causes the air that is flowing in parallel to the centerline of the coupler 62 to be deflected sideways by the confronting surface of the blade stringer 30. Thus, the pressurized air from the compressed air supply 80 flows through hose 66, gas inlet 64, coupler 62, coupler 78 and particle trap 68 in sequence. Debris produced by impingement of laser pulses on the ablative layer adhered to the surface of the composite structure being inspected will be carried by the flowing air into the particle trap 68, where any debris will be captured. The flight of the debris from a space in proximity to the surface of the inspected part (e.g., blade stringer 30) toward the particle trap 68 is indicated by arrow 22 in FIG. 5.

The focusing lens 70 (see FIG. 4) has a diameter slightly smaller than the inner diameter of the lens tube 42. For example, the diameter of the focusing lens 70 may be 2 inches. In one proposed implementation, the lens tube 42 has an inner diameter several hundredths of an inch greater than 2 inches, while the lens tube spacer has an inner diameter several hundredths of an inch greater than 1 inch.

Figure 6:
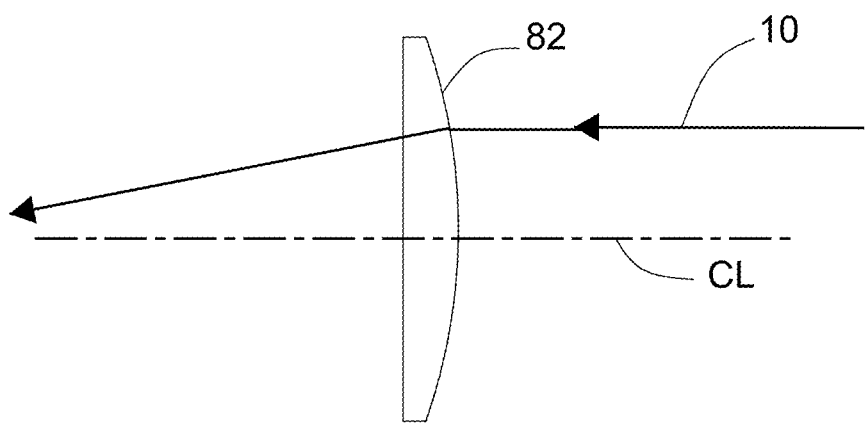
FIG. 6 is a diagram representing a side view of a laser beam (one ray of which is indicated by the line with two arrowheads) as it passes through a plano convex lens.

Lenses are classified by the curvature of the two optical surfaces. In accordance with one proposed implementation, the focusing lens 70 is a plano convex lens. A plano convex lens has one flat surface and one concave surface. FIG. 6 is a diagram representing a side view of a laser beam 10 (one ray of which is indicated by the line with two arrowheads) as it passes through a plano convex lens 82 having a centerline CL. For example, the plano convex lens 82 may be made of the borosilicate glass Schott BK7. Borosilicates contain about 10% boric oxide, have good optical and mechanical characteristics, and are resistant to chemical and environmental damage. For some laser bond inspection applications in which it would be desirable to reduce the diameter of the lens beam entering the focusing lens from 1 inch to 0.1 inch at the surface of the inspected workpiece, a plano convex lens 82 having a focal length of 150 or 175 mm may be used as the focusing lens. Preferably an anti-reflection coating is applied on the surfaces of the plano convex lens 82 to reduce reflection of laser light at the glass/air interface. In an alternative embodiment, a biconvex lens may be used instead of a plano convex lens.

Figure 7:
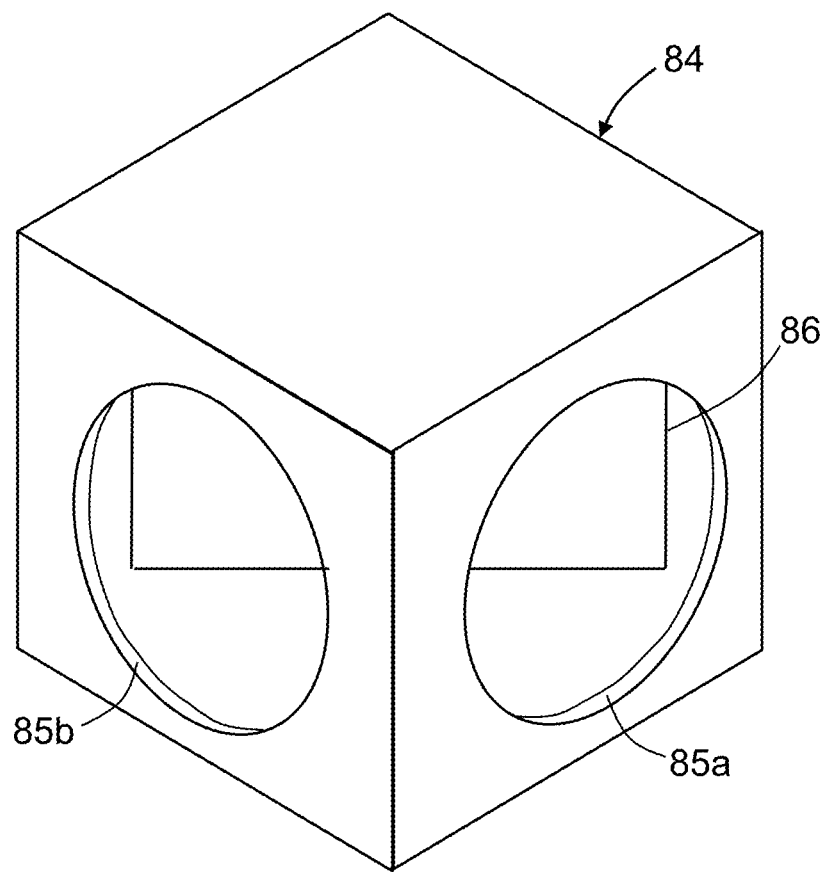
FIG. 7 is a diagram representing a view of a housing containing a flat turning mirror in accordance with one proposed implementation.

The process head 38 includes two reflectors mounted inside rotatable housings 50 and 54. In the embodiment depicted in FIG. 4, the diagonal lines inside the housings indicate reflective surfaces of respective flat turning mirrors 51 and 53. FIG. 7 is a diagram representing a view of a housing 84 containing a flat turning mirror 86 in accordance with one proposed implementation. The housing 84 is a cube having two openings 85*a* and 85*b* in two of the six faces of the cube. Light entering the housing 84 via opening 85*a* will reflect off of the flat turning mirror 86 and exit the housing 84 via the opening 85*b*.

Figure 8:
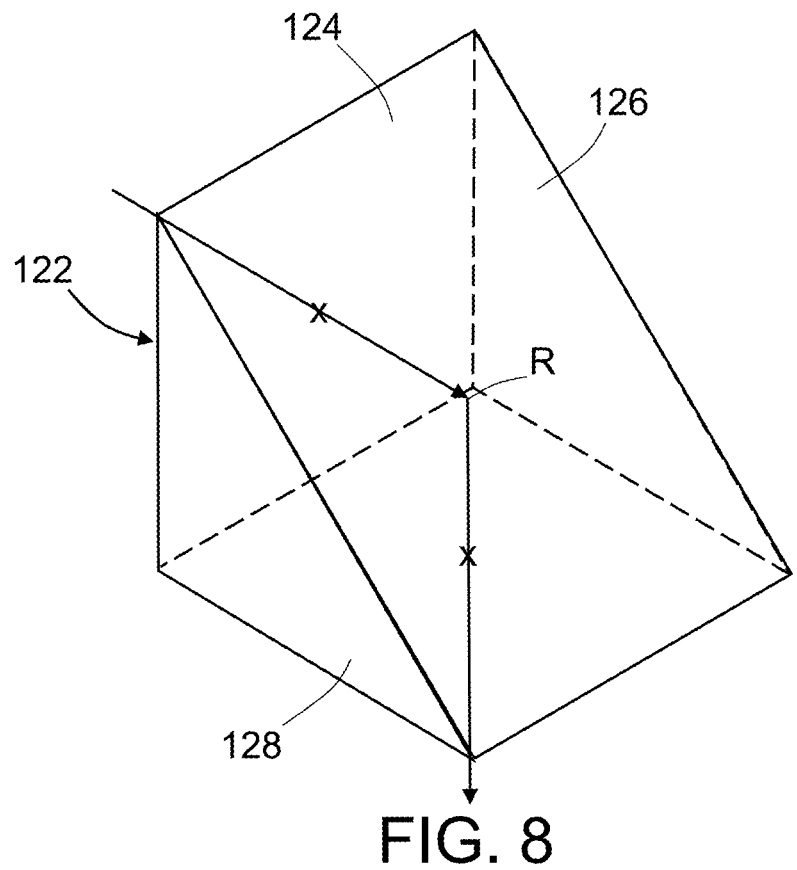
FIG. 8 is a diagram representing a three-dimensional view of a right angle prism with hidden edges being indicated by dashed lines.

Instead of a flat turning mirror, the light may be reflected using a right-angle prism. FIG. 8 is a diagram representing a three-dimensional view of the right-angle prism 122. Light entering the housing 84 via opening 85*a* will enter the right-angled prism 122 through one square face 124 (at a location indicated by an "x" in FIG. 8), be internally reflected by a rectangular surface 126 (at a location R), and exit the right-angled prism 122 through another square face 128 (at a location indicated by an "x" in FIG. 8) which is perpendicular to the square face 124. The reflected light will then exit the housing 84 via the opening 85*b*.

Figure 9:
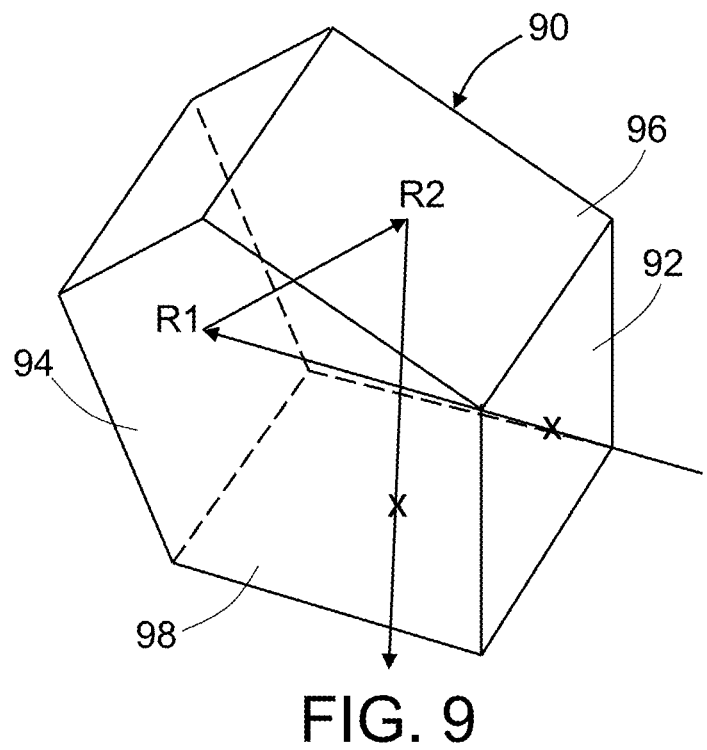
FIG. 9 is a diagram representing a three-dimensional view of a penta prism with hidden edges being indicated by dashed lines.

Alternatively, penta prisms may be used instead of right-angle prisms. FIG. 9 is a diagram representing a three-dimensional view of a penta prism 90. A penta prism is a five-sided reflecting prism used to redirect a light beam by 90 degrees. As seen in FIG. 9, the light beam (indicated by arrows) is reflected twice inside the penta prism 90. More specifically, the light beam enters the penta prism 90 through surface 92 at a first spot (indicated by an "x" in FIG. 9), is reflected by a reflective coating applied on a surface 94 at a second spot located at R1, is reflected by a reflective coating on the surface 96 at a third spot located at R2, and then exits the penta prism 90 through surface 98 at a fourth spot (indicated by an "x").

Figure 10:
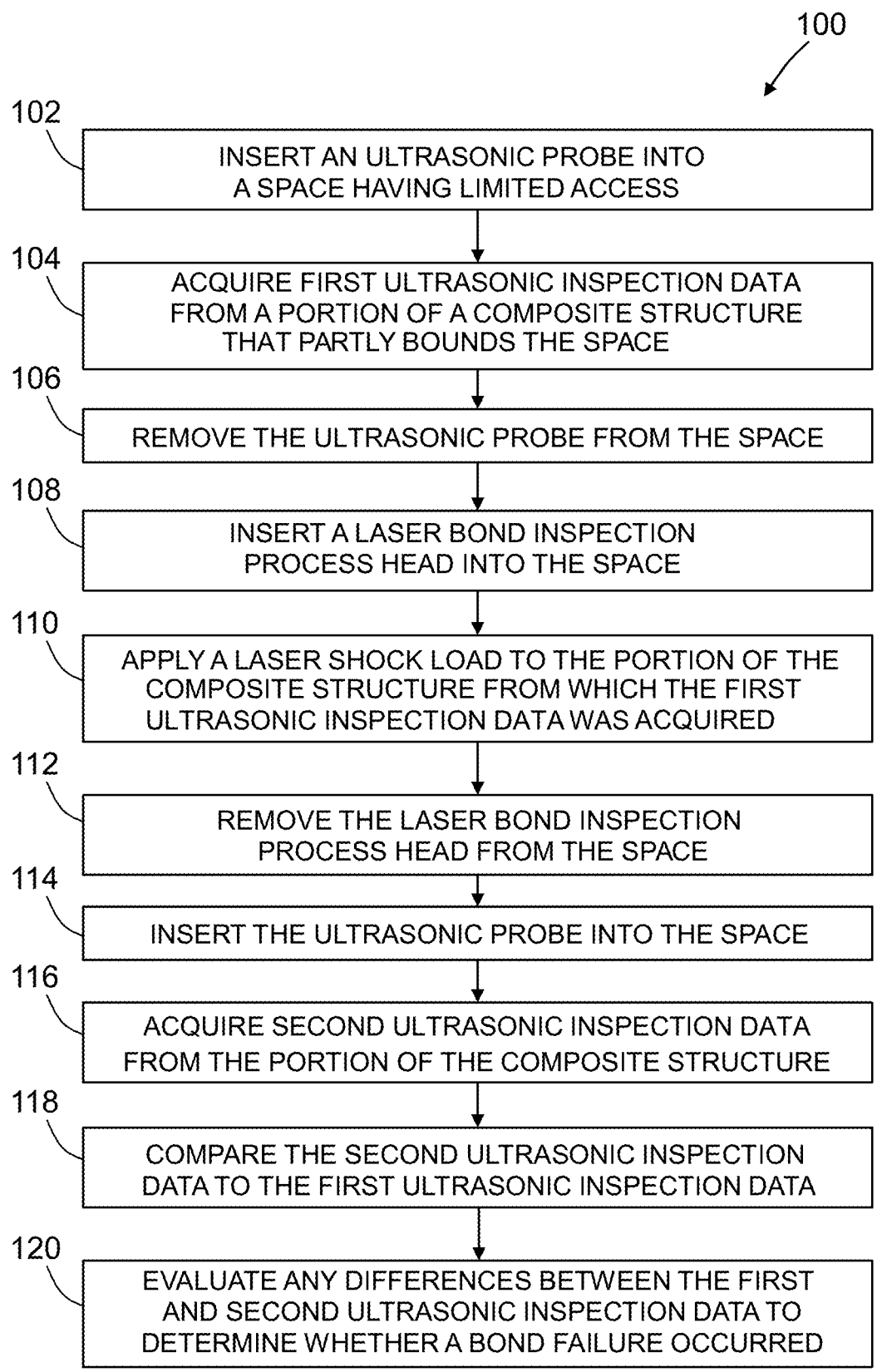
FIG. 10 is a flowchart identifying steps of a method for laser bond inspection of internal bonds in a composite structure configured with areas allowing limited access in accordance with one embodiment.

As previously mentioned, the application of a laser-induced shock wave is part of a laser bond inspection process that includes performing ultrasonic inspections before and after application of the laser shock wave. FIG. 10 is a flowchart identifying steps of a method for laser bond inspection of internal bonds in a composite structure configured with areas allowing limited access in accordance with one embodiment. The method 100 includes the following steps performed in the order listed: inserting an ultrasonic probe into a space having limited access (step 102); using the ultrasonic probe to acquire first ultrasonic inspection data from a portion of a composite structure that partly bounds the space (step 104); removing the ultrasonic probe from the space (step 106); inserting a laser bond inspection process head into the space vacated by the ultrasonic probe (step 108); applying a laser-induced shock load to the portion of the composite structure from which the first ultrasonic inspection data was acquired using the laser bond inspection process head (step 110); removing the laser bond inspection process head from the space (step 112); inserting the ultrasonic probe into the space vacated by the laser bond inspection process head (step 114); using the ultrasonic probe to acquire second ultrasonic inspection data from the portion of the composite structure (step 116); comparing the second ultrasonic inspection data to the first ultrasonic inspection data (step 118); and evaluating any differences between the first and second ultrasonic inspection data to determine whether the differences indicate a bond failure (step 120). The limited-access space has a dimension (e.g., a width) that is less than one inch. The step of applying a laser induced shock load comprises directing a laser beam onto an ablative layer applied to the surface of the portion of the composite structure to form a laser spot having a diameter in a range of approximately 2 to 3 millimeters.

While apparatus and methods for laser bond inspection of internal bonds in a composite structure with limited access have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

Computer numerical control (CNC) is the automation of machine tools by means of computers executing pre-programmed sequences of machine control commands. Some steps of the methods described herein may be encoded as executable instructions embodied in a non-transitory tangible computer-readable storage medium, including, without limitation, a storage device and/or a memory device. Such instructions, when executed by a CNC controller, cause the apparatus to perform at least a portion of the methods described herein. For example, a CNC controller may be used to control the articulated arm to cause the process head to move in increments along a line, stopping intermittently to impose laser-induced shock loads at positions spaced apart along a surface of the portion of the composite laminate being inspected.

As used herein, the term "controller" means a computer or processor configured to execute pre-programmed sequences of machine control commands for controlling computer-controlled components of the contact insertion and retention testing apparatus disclosed herein.

The embodiments disclosed above use one or more processing or computing devices. Such devices typically include a processor, processing device, or controller, such as a general-purpose central processing unit, a microcontroller, a reduced instruction set computer processor, an application-specific integrated circuit, a programmable logic circuit, a field-programmable gate array, a digital signal processor, and/or any other circuit or processing device capable of executing the functions described herein. The methods described herein may be encoded as executable instructions embodied in a non-transitory tangible computer-readable storage medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms "processor" and "computing device".

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A system for delivering a laser beam to a surface of a part with limited access, comprising:
   a laser device configured to emit a laser beam;
   a beam delivery system optically coupled to receive any laser beam from the laser device and comprising an articulated arm; and
   a process head optically coupled to receive and configured to focus any laser beam from the laser device, wherein the process head comprises:
   a lens tube optically coupled to admit a laser beam from the beam delivery system;
   a focusing lens disposed inside the lens tube;
   a first housing which is rotatable relative to the lens tube and has a first opening facing the focusing lens and a second opening not facing the focusing lens;
   a first reflector disposed inside the first housing and configured and oriented to turn a laser beam entering the first housing via the first opening by a first turning angle so that the laser beam exits the first housing via the second opening;
   a second housing which is rotatable relative to the first housing and having a third opening facing the second opening in the first housing and a fourth opening not facing the second opening in the first housing;
   a second reflector disposed inside the second housing and configured and oriented to turn a laser beam entering the second housing via the third opening by a second turning angle so that the laser beam exits the second housing via the fourth opening;
   a first coupler mechanically coupled to the second housing and having an opening at a distal end through which a laser beam received from the second reflector will exit the first coupler; and
   a first hermetically sealed revolute joint having solid lubricant that rotatably couples the second housing to the first housing.

2. The system as recited in claim 1, further comprising a second hermetically sealed revolute joint that rotatably couples the first housing to the lens tube.

3. The system as recited in claim 1, wherein the opening of the first coupler has a diameter less than 0.5 inch.

4. The system as recited in claim 1, wherein the focusing lens is a plano convex lens.

5. The system as recited in claim 1, wherein the first reflector is a penta prism having internal reflective surfaces.

6. The system as recited in claim 1, wherein the first reflector is a right-angle prism.

7. The system as recited in claim 1, wherein the process head further comprises an anamorphic prism pair disposed inside the lens tube in the optical path of any laser beam entering the lens tube, wherein the anamorphic prism pair is configured to change the shape of the laser beam to produce an elliptical profile such that a circular profile is projected onto the surface of the part when the beam is projected off-normal.

8. The system as recited in claim 1, further comprising a source of compressed gas and a hose connected to the source of compressed gas, wherein the process head further comprises:
   a second coupler that mechanically couples the first coupler to the second housing;
   a protective window disposed inside the second coupler in an optical path of any laser beam exiting the second housing via the fourth opening;
   a gas inlet intersecting and connected to a wall of the first coupler at an oblique angle and in fluid communication with an interior volume of the first coupler, the hose being connected to the gas inlet;
   a third coupler that is joined to the first coupler near one end of the first coupler so that the first and third coupler intersect at an oblique angle; and
   a particle trap coupled to another end of the third coupler and in fluid communication with an interior volume of the third coupler.

9. The system as recited in claim 8, wherein the particle trap is an air filter.

10. The system as recited in claim 8, wherein the joined first and third couplers are configured so that air flowing in the first coupler will be diverted into the third coupler when an opening of the joined first and third couplers is blocked.

11. A process head comprising:
    a lens tube optically coupled to admit a laser beam from a beam delivery system;
    a focusing lens disposed inside the lens tube;
    a first housing which is rotatable relative to the lens tube and has a first opening facing the focusing lens and a second opening not facing the focusing lens;
    a first reflector disposed inside the first housing and configured and oriented to turn a laser beam entering the first housing via the first opening by a first turning angle so that the laser beam exits the first housing via the second opening;
    a second housing which is rotatable relative to the first housing and having a third opening facing the second opening in the first housing and a fourth opening not facing the second opening in the first housing;
    a second reflector disposed inside the second housing and configured and oriented to turn a laser beam entering the second housing via the third opening by a second turning angle so that the laser beam exits the second housing via the fourth opening;
    a first coupler mechanically coupled to the second housing and having an opening at a distal end through which a laser beam received from the second reflector will exit the first coupler; and
    a first hermetically sealed revolute joint having solid lubricant that rotatably couples the second housing to the first housing.

12. The process head as recited in claim 11, further comprising a second hermetically sealed revolute joint having solid lubricant that rotatably couples the first housing to the lens tube.

13. The process head as recited in claim 11, wherein the opening of the first coupler has a diameter less than 0.5 inch.

14. The process head as recited in claim 11, wherein the focusing lens is a plano convex lens or biconvex lens.

15. The process head as recited in claim 11, wherein the first reflector is a penta prism having internal reflective surfaces.

16. The process head as recited in claim 11, wherein the first reflector is a flat turning mirror or a right-angle prism.

17. The process head as recited in claim 11, further comprising an anamorphic prism pair disposed inside the lens tube in the optical path of any laser beam entering the lens tube, wherein the anamorphic prism pair is configured to change the shape of the laser beam to produce an elliptical profile such that a circular profile is projected onto the surface of the part when the beam is projected off-normal.

18. A process head comprising:
- a lens tube optically coupled to admit a laser beam from a beam delivery system;
- a focusing lens disposed inside the lens tube;
- a first housing which is rotatable relative to the lens tube and has a first opening facing the focusing lens and a second opening not facing the focusing lens;
- a first reflector disposed inside the first housing and configured and oriented to turn a laser beam entering the first housing via the first opening by a first turning angle so that the laser beam exits the first housing via the second opening;
- a second housing which is rotatable relative to the first housing and having a third opening facing the second opening in the first housing and a fourth opening not facing the second opening in the first housing;
- a second reflector disposed inside the second housing and configured and oriented to turn a laser beam entering the second housing via the third opening by a second turning angle so that the laser beam exits the second housing via the fourth opening;
- a first coupler mechanically coupled to the second housing and having an opening at a distal end through which a laser beam received from the second reflector will exit the first coupler;
- a second coupler that mechanically couples the first coupler to the second housing;
- a protective window disposed inside the second coupler in an optical path of any laser beam exiting the second housing via the fourth opening;
- a gas inlet intersecting and connected to a wall of the first coupler at an oblique angle and in fluid communication with an interior volume of the first coupler;
- a third coupler that is joined to the first coupler near one end of the first coupler so that the first and third coupler intersect at an oblique angle; and
- a particle trap coupled to another end of the third coupler and in fluid communication with an interior volume of the third coupler.

19. The process head as recited in claim 18, wherein the particle trap is an air filter.

20. The process head as recited in claim 18, wherein the joined first and third couplers are configured so that air flowing in the first coupler will be diverted into the third coupler when an opening of the joined first and third couplers is blocked.

* * * * *